United States Patent [19]

Ohma

[11] Patent Number: 5,328,196
[45] Date of Patent: Jul. 12, 1994

[54] WHEEL SUSPENSION SYSTEM FOR BICYCLE

[75] Inventor: Toshio Ohma, Shizuoka, Japan

[73] Assignee: Showa Manufacturing Co., Ltd., Gyoda, Japan

[21] Appl. No.: 850,429

[22] Filed: Mar. 12, 1992

[30] Foreign Application Priority Data

Mar. 20, 1991 [JP] Japan .................................. 3-80442
Mar. 20, 1991 [JP] Japan .................................. 3-80443
Mar. 20, 1991 [JP] Japan .................................. 3-80444

[51] Int. Cl.$^5$ ........................................... B62K 25/08
[52] U.S. Cl. ................................ 280/276; 188/24.12; 188/282
[58] Field of Search ............... 188/282, 317, 24.12, 188/24.21; 280/276, 275, 279, 280, 283, 284

[56] References Cited

U.S. PATENT DOCUMENTS

| | | | |
|---|---|---|---|
| 2,329,770 | 9/1943 | Knox | 29/511 |
| 3,470,986 | 10/1969 | Whisler, Jr. | 188/317 X |
| 4,203,507 | 5/1980 | Tomita et al. | 188/282 X |
| 4,515,252 | 5/1985 | Hidaka et al. | 188/282 |
| 4,971,344 | 11/1990 | Turner | 280/276 |

FOREIGN PATENT DOCUMENTS

| | | | |
|---|---|---|---|
| 1260899 | 2/1968 | Fed. Rep. of Germany | |
| 2746879 | 4/1979 | Fed. Rep. of Germany | |
| 3720584 | 1/1988 | Fed. Rep. of Germany | |
| 3820307 | 7/1989 | Fed. Rep. of Germany | |
| 0401115 | 8/1909 | France | 188/24.21 |
| 1051108 | 1/1945 | France | |
| 1054763 | 2/1954 | France | 280/276 |
| 1083394 | 1/1955 | France | |
| 1103855 | 11/1955 | France | |
| 64890 | 12/1955 | France | |
| 69875 | 1/1959 | France | |
| 2231289 | 9/1990 | Japan | |
| 2234038 | 1/1991 | United Kingdom | |

OTHER PUBLICATIONS

Japanese Patent Publication No. 2-231289-pp. 679-687.

Primary Examiner—Margaret A. Focarino
Assistant Examiner—Victor E. Johnson
Attorney, Agent, or Firm—Dvorak and Traub

[57] ABSTRACT

A wheel suspension system for a bicycle is provided with a telescopically coupled sliding tube and a fork leg forming a suspension assembly with a shock absorber assembly. The fork leg is provided satisfactorily high rigidity for withstanding torsional torque which is potentially exerted through a brake lever during application of a brake. The fork leg with sufficient rigidity can be formed from a tubular material. For this purpose, the wheel suspension system comprises a pair of left and right sliding tubes secured to a steering bracket which is rotatably supported in the front portion of a body frame of the bicycle, a pair of left and right fork legs supporting a front wheel and slidably receiving corresponding one of the sliding tubes, shock absorber assemblies respectively disposed between respective sliding tubes and the fork legs, cross member holders externally mounted on the outer peripheries of the upper portions of the fork legs, and a cross member provided with a predetermined torsional strength and bridging over the cross member holders.

5 Claims, 5 Drawing Sheets (A)

(B)

(A)

(B)

WHEEL SUSPENSION SYSTEM FOR BICYCLE

BACKGROUND OF THE INVENTION

1. Field of the Invention

The present invention relates to a wheel suspension system for a bicycle and a fork leg therefor.

2. Description of the Related Art (1) Wheel Suspension System for Bicycle (A) Conventionally, for bicycles, such as a so-called "mountain bicycle" or "Off-Road bicycle", there is employed a wheel suspension mechanism which includes a sliding tube fixed to a steering bracket which is rotatably supported in the front portion of a bicycle body frame, a pair of left and right cylindrical fork legs slidingly engaged with the sliding tube and supporting a front wheel, and a shock absorber assembly disposed between the sliding tube and a respective one of the fork legs, as disclosed in Japanese Unexamined Patent Publication (Kokai) No. 2-231289, for example. In such a wheel suspension mechanism, when the fork leg slides with respect to the sliding tube, the shock absorber assembly becomes active to absorb road shock caused by undulation on the road surface.

However, in the above-mentioned suspension mechanism, a suspension member for supporting the front wheel with respect to the steering bracket is separated into a sliding tube and the fork legs thus have relatively low rigidity. Particularly, when a brake lever is mounted on the outer periphery of the fork member at the upper portion thereof, a reacting brake force exerted on the brake lever during application of the brake is transmitted to the fork leg as a torsional stress. Therefore, in such case, it becomes necessary to provide sufficient rigidity.

The above-mentioned Japanese Unexamined Patent Publication 2-231289 proposes, as a solution for the lack of rigidity, to provide an essentially a U-shaped cross member with a given torsion strength to connect the left and right fork legs.

However, in such prior art, mounting bosses are necessary in the upper portion of the fork members for connecting the cross member. Typically, a mounting boss is formed by machining, after casing the fork leg with a material, such an as aluminum alloy. This makes it impossible to employ a tube material, such as extrusion tubes, drawing tubes and so forth, as a material for the fork leg.

In view of the problem set forth above, it is an object of the present invention to enable the tube material to be used as the material for the fork legs in constructing the suspension mechanism, in which the sliding tube and the fork legs are telescopically coupled and the upper portions of the left and the right fork legs are joined by means of a cross member.

(B) On the other hand, the conventional shock absorber assembly merely comprises a compression stroke relief valve which is responsive to a shock acting on the suspension mechanism due to an undulation over 1 inch on the road surface to open a compression stroke fluid path, and a check valve which is closed during compression stroke and open during and extension stroke.

With such construction, the conventional shock absorber cannot absorb a small undulation an the load surface and thus causes a rough and uncomfortable ride feeling.

In view of such a defect in the prior art, it is an object of the present invention to provide a wheel suspension system which can satisfactorily absorb shock even when the shock is caused by a substantially small road undulation, for providing a stable and comfortable ride and can generate a damping force both in the compression stroke and the extension stroke.

(2) Fork Leg for a Wheel Suspension System of Bicycle (C) As the conventional wheel suspension system for the bicycle, the foregoing Japanese Unexamined Patent Publication 2-231289 discloses a structure, in which a damping force generating fluid chambers are defined within the fork legs to slidingly receive therein the bifurcated lower portions of the sliding tube, and a wheel axle supports are formed on the lower reduced diameter sections of the respective fork legs.

In the prior art, such fork legs are manufactured by casting from aluminum alloy and then machining. This increases the manufacturing cost of the fork legs.

The inventors have attempted to manufacture less expensive fork legs by employing a cold forging technique of tubular material.

However, when the fluid chamber is to be defined within the interior space of the fork leg, a substantially high precision level in the shape of the periphery of the fluid chamber is required. For this reason, during a forging process for reducing the diameter at the lower portion of the fork leg, some measure, such as an insertion of a core metal, becomes necessary for maintaining a sufficient level of precision of the shape of the periphery of the fluid chamber. This makes the process complicated and time and labor intensive work.

Therefore, it is a further object of the present invention to make a high precision and less expensive fork legs with a simplified process.

SUMMARY OF THE INVENTION (1) Wheel Suspension System for Bicycle (A) In order to accomplish the above-mentioned and other objects, and in accordance with one aspect of the invention, a wheel suspension system for a bicycle comprising:

a pair of left and right sliding tubes secured to a steering bracket which is rotatably supported in the front portion of a body frame of the bicycle;

a pair of left and right fork legs supporting front wheels of and slidably receiving corresponding one of the sliding tubes;

shock absorber assemblies respectively disposed between respective of associated sliding tubes and the fork legs;

cross member holders externally mounted on a outer peripheries of upper portions of the fork legs; and a cross member providing a predetermined torsional strength and bridging over the cross member holders.

With the construction set forth above, the following advantage can be realized. The cross member is mounted on the upper portion of the fork leg through the cross member holder. Accordingly, it becomes unnecessary to provide a cross member mounting boss for the fork leg. This makes it unnecessary to use machining for forming the cross member mounting boss after casting the fork leg. Accordingly, this allows a tubular material, such as an extrusion tube, drawing tube and so forth, to be used as a material for the production of the fork leg.

In the wheel suspension system set forth above, it is preferred that each of the cross member holders is provided with front and rear mounting sections, a front cross member is provided for bridging between the front mounting sections of the cross member holders on respective of left and right fork legs, and a rear cross member is provided for bridging between rear mounting sections of the cross member holders.

With the preferred construction set forth above, the following advantage can be realized. Since the front and rear cross members are provided on front and rear sides of the upper portion of the fork leg via the cross member holder. This further increases rigidity of the fork leg.

In the construction set forth above, it is further preferred that the cross member holder be mounted on the outer periphery of the fork member with an establishing projection and recess engagement.

With the above-mentioned further preferred construction, the following advantage can be realized. Since the cross member holder is mounted on the upper portion of the fork leg with an established projection-and-recess and-recess engagement for completely preventing relative angular displacement to each other, the torsional strength of the suspension system can be further increased.

(B) According to another aspect of the invention, a wheel suspension system for a bicycle comprises:

a pair of left and right sliding tubes secured to a steering bracket which is rotatably supported in a front portion of a body frame of the bicycle;

a pair of left and right fork legs for supporting front wheels of and slidably receiving a corresponding one of the sliding tubes;

shock absorber assemblies respectively disposed between respective of the associated sliding tubes and fork legs;

the shock absorber assembly including
  a piston body defining an upper chamber at a side of the sliding tube and a lower chamber at a side of the fork leg;
  a first valve disposed in the piston at a side of the upper chamber and normally biased for closing a compression stroke flow passage for fluid flow from the lower chamber to the upper chamber;
  a second valve disposed in the piston body at a side of the lower chamber and responsive to a fluid pressure difference between the upper and lower chambers during an extension stroke to open a an extension stroke flow passage for the fluid from the upper chamber to the lower chamber; and
  a flow restrictive communication passage constantly establishing a fluid communication between the upper and lower chambers in a limited fluid flow rate.

With the construction set forth above, the following advantages can be realized. During compression stroke of the suspension system, the first valve opens the compression stroke flow path against the biasing force of a valve spring to permit fluid flow from the lower chamber to the upper chamber. Due to the spring bias of the valve spring, a fluid flow path area formed by the first valve serves as flow restrictive path to generate a damping force resisting against relative axial displacement between the sliding tube and the fork leg. Furthermore the air pressure in the a pneumatic chamber also provides some resistance against the fluid flow from the lower chamber to upper chamber for contributing to the damping of the bump energy. On the other hand, during an extension stroke of the suspension system, the second valve is deformed in a magnitude variable depending upon the pressure difference between the upper and lower chambers, which pressure difference substantially corresponds to the stroke speed of the extension motion between the sliding tube and the fork leg. Depending upon the magnitude of deformation of the second valve, the variable path area flow restrictive fluid path is defined to generate the damping force variable depending upon the extension stroke speed. Also, the flow restricting fluid passage constantly permits fluid a flow between the upper and lower chamber in the limited fluid flow rate to constantly generate a damping force.

Accordingly, even at a small undulation or projection on the load, shock can be satisfactorily absorbed. Furthermore, since the damping force can be generated both in the compression and extension strokes, stable suspension system can be obtained.

In the above-mentioned alternative aspect of the invention, it is preferred that the second valve comprises a disc valve which comprises an inner annular portion, an outer annular portion and a connecting portion extending between the inner and outer annular portions, the inner annular portion being secured on the piston body, and the outer annular portion is located at a position closing the extension stroke flow passage.

With this construction, the following advantage can be obtained. Since the inner and outer annular portions of the disc valve are connected through a connecting portion which has greater flexibility than the annular portions, the deformation stroke at the outer annular portion becomes greater to provide greater range of adjustment of the damping characteristics.

Also, in the above-mentioned construction in the alternative aspect of the invention, it is preferred that a spring seat is provided for the valve spring of the first valve, which spring seat is adjustable of the axial position for varying the spring force to be exerted on the first valve with an adjusting means externally inserted into the sliding tube in a rotatable fashion.

With the construction set forth above, the following advantage can be realized. Due to the position of the spring seat of the valve spring for the first valve by means of the adjusting means from the outside of the sliding tube, it enables adjustment of the damping characteristics at the compression stroke.

(2) Fork Leg for Wheel Suspension System of Bicycle

According to a further aspect of the invention, a fork leg for a wheel suspension system of a bicycle formed through a process of forming the fork leg from a tubular material, defining a damping force generating fluid chamber into which a sliding tube is slidably inserted, and forming a wheel axle support at the lower reduced diameter portion of the fork leg, wherein an end member for defining the fluid chamber being arranged within the fork leg, the end member being integrally fixed within the fork leg during a reducing forging process for the lower portion of the fork leg to form a reduced diameter portion.

With the further alternative aspect of the invention, utilizing the fact that the end member is firmly secured within the interior space of the fork leg, reducing forging for the lower portion of the fork leg can be performed using the end member as the metal core. Accordingly, production process can be simplified, and high accuracy and a low price fork leg can be obtained.

BRIEF DESCRIPTION OF THE DRAWINGS

The present invention will be understood more fully from the detailed description given herebelow and from the accompanying drawings of the preferred embodiment of the invention, which, however, should not be taken to limit the invention in any way, but are for explanation and understanding only.

In the drawings.

DESCRIPTION OF THE PREFERRED EMBODIMENT

Figure 6:
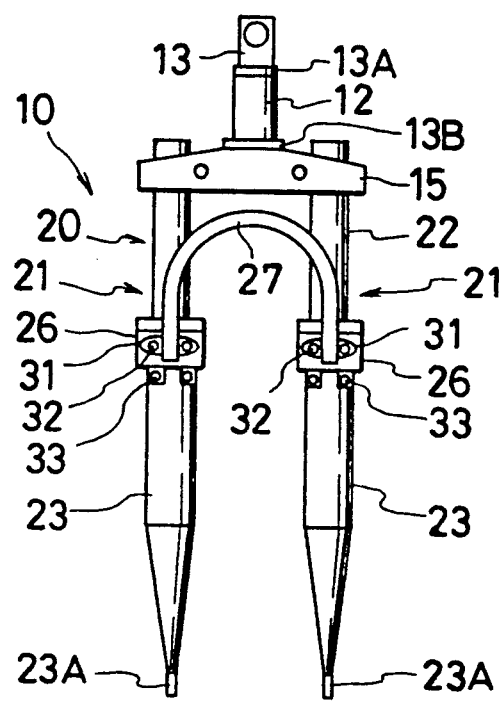
FIG. 6 is a front elevation showing the major part of the wheel suspension system.
Figure 7:
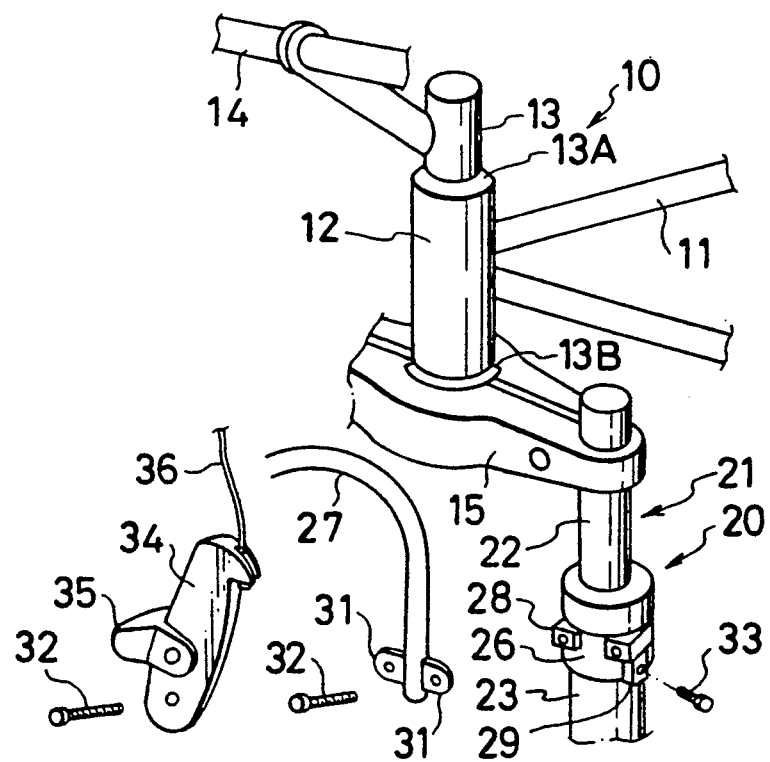
FIG. 7 is a perspective view showing the major part of the wheel suspension system.

As shown in FIGS. 6 and 7, a bicycle which is not shown in the overall structure but generally represented by the reference numeral 10, has a frame body 11, in which a steering shaft 13 is rotatably received through a head pipe 12 positioned at the front portion of the frame body and having bearings 13A and 13B at upper and lower ends thereof. A handle bar 14 is rigidly secured on an upwardly extending portion of the steering shaft 13. A steering bracket 15 is rigidly secured on the downwardly extending portion of the steering shaft 13.

The preferred embodiment of a wheel suspension system 20, according to the present invention, includes a pair of left and right telescopic suspension assemblies 21. Each of the suspension assemblies 21 has the identical construction to each other and comprises a sliding tube 22 rigidly secured on the steering bracket 15, a generally cylindrical fork legs 23, and a shock absorber assembly 24 disposed between the sliding tube 22 and the fork leg 23.

In the shown embodiment, the fork leg 23 is formed through cold forging process and has a wheel axle hub section 23A at a lower reduced diameter section thereof.

As shown in FIGS. 1, 2, 6 and 7, the wheel suspension system 20 includes a cross member holder 26 which is externally fitted onto the outer periphery of the fork leg 23 at a position immediately below an increased diameter section 25. An essentially U-shaped cross member 27 is connected over the cross member holders 26 of the left and right fork legs 23, which cross member 27 is provided a predetermined torsion strength. With this construction, the wheel suspension system 20 compensates lack of rigidity due to separated construction of the sliding tube 22 and the fork leg 23 so that the fork legs 23 are assured to have sufficiently high rigidity with respect to the torsional stress which may acts thereon due to reaction force of a braking force to be exerted on a brake lever 34 during application of brake.

Figure 3:
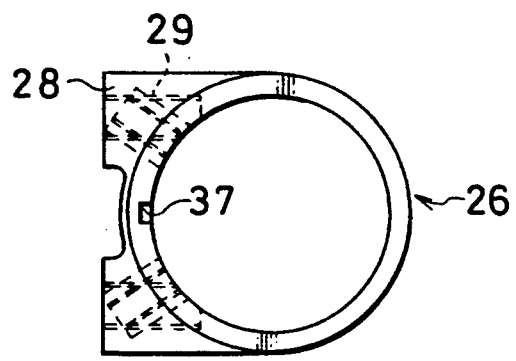
FIG. 3 is a plan view of a cross member holder.

The cross member holder 26 has an essentially annular ring shaped configuration shown in FIG. 3. The cross member holder 26 provided with a cross member mounting boss 28 and a pair of threaded bosses 29 for screw fastening engagement between the fork leg and the cross member holder at the desired orientation. The cross member 27 is mounted on the cross member holders 26 on the left and right fork legs 23 through mounting brackets 31 by means of fastening screws 32. The cross member holder 26 is retained in place and prevented from axial displacement along the fork leg 23 by means of a retainer ring 26A fixed onto the outer periphery of the fork leg 23 at the position corresponding to the lower end of the cross member holder. The cross member holder 26 is further secured rigidly on the outer periphery of the fork leg 23 by means of fastening screws 33 engaging through the threaded bosses 29.

A brake lever 34 which forms a rim type brake system is secured on the cross member mounting boss 28 of one of the cross member holder 26 commonly with one of the mounting bracket 31 of the cross member 27 by means of the fastening screw 32, as shown in FIG. 7. In FIG. 7, the reference numeral 35 denotes a brake pad and 36 denotes a brake wire.

It should be noted that, in the alternative embodiment, the cross member holder 26 may be provided a brake lever mounting boss separately from the cross member mounting boss 28 so that the brake lever 34 may be mounted on this brake lever mounting boss independently of the cross member.

In the further alternative, the cross member 26 may be formed without the threaded bosses 29, and provided a key recess 37 on the inner periphery thereof so that the key recess may receive a key projecting from the outer periphery of the fork leg 26 to restrict circumferential displacement thereof relative to the fork leg. In such case, the cross member holder 26 is retained in place by the combination of the effect of the retainer ring 26A mating the lower edge of the cross member holder and the key engagement between the key and key recess 37.

Figure 1:
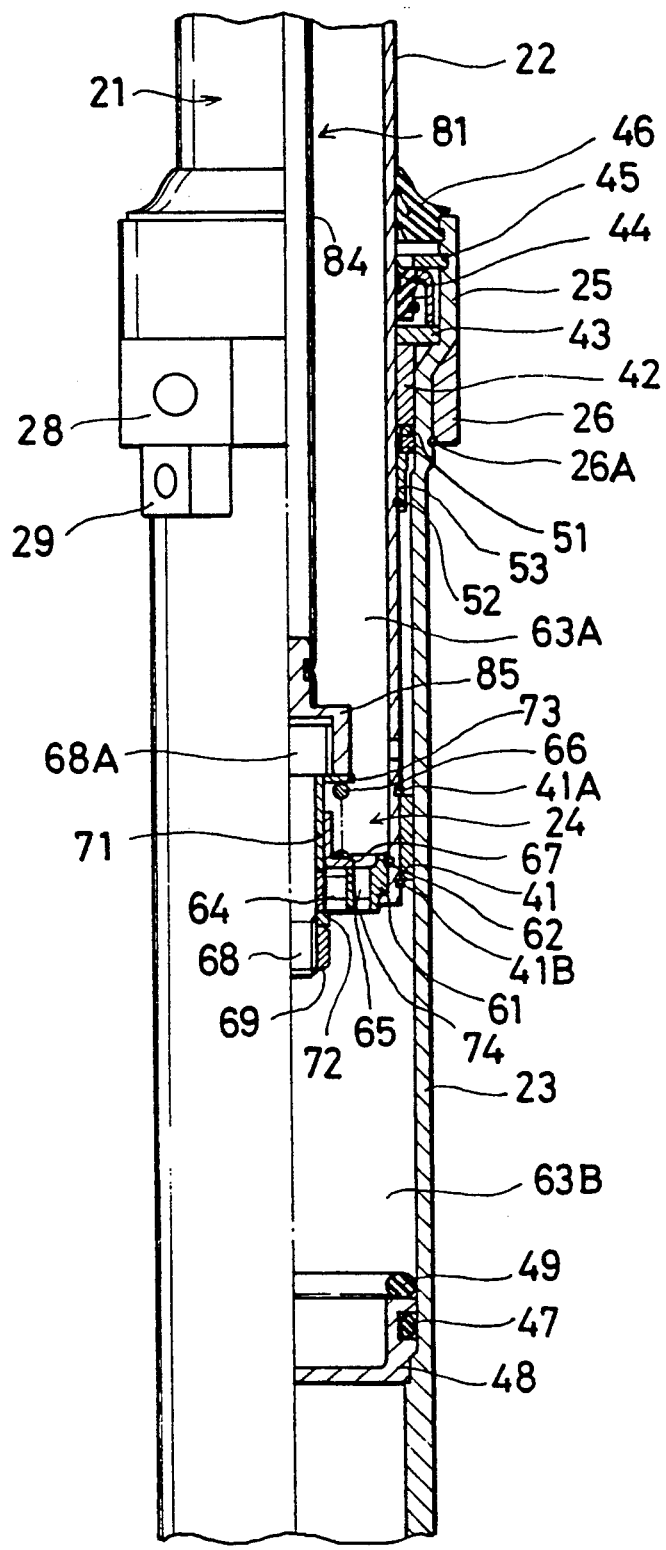
FIG. 1 is a section of the major part of one example of a suspension assembly forming a wheel suspension system according to the invention.
Figure 2:
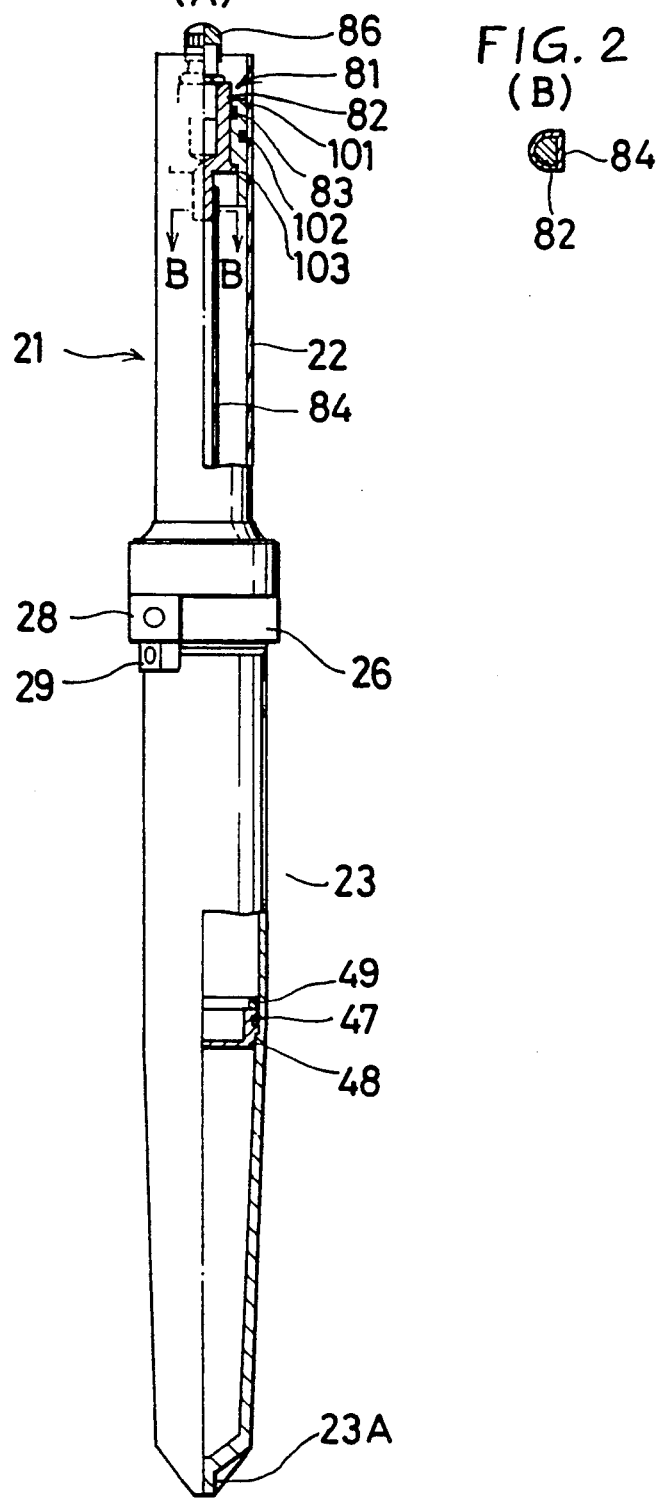
FIG. 2 is a partially sectioned front elevation showing the suspension assembly, in which (A) shows overall construction of the suspension assembly, and (B) shows a section taken along line B—B.

As shown in FIGS. 1 and 2, the suspension assembly 21 permits relative sliding and telescopic movement of the sliding tube 22 and the fork leg 23, by a guide bushing 41 secured on the outer periphery of the sliding tube 22 in the vicinity of the lower end by means of fastening rings 41A and 41B, and a guide bushing 42 press fitted onto the inner periphery of the fork leg 26 in the vicinity of the upper end thereof. Within a space defined between the increased diameter section 25 of the fork leg 23 and the outer periphery of the sliding tube 22, a seal spacer 43, an oil seal 44, a stopper ring 45 and a dust seal 46 are mounted for establishing seal therebetween.

An end plug member 48 having an 0 ring 47 fitted onto the outer periphery thereof, is press fitted onto the inner periphery of the fork leg 23 at the longitudinal intermediate position of the latter. A bumper rubber 49 is mounted on the upper end of the end plug member 48. With this construction of the suspension assembly 21, the end of the compression stroke is defined by the end plug member 48 so that a piston body 61 which is fixedly coupled with the lower inner periphery of the sliding tube 22 may abut onto the bumper rubber 49 of the end plug member 48 so as to prevent further relative movement of the fork member and the sliding tube in the compression direction. Detailed discussion for the piston body 61 will be given later.

A rebounding rubber 51 is mounted on the upper inner periphery of the fork leg 23 and positioned immediately below the upper guide bushing 42. The rebounding rubber 51 is active against a rebounding seat 53 which is fixed on the outer periphery of the sliding tube 22 at the intermediate position of the latter so that the rebounding seat 53 may abut against the upper guide bushing 42 via the rebounding rubber 51 at the end of the extension stroke of the suspension assembly 21.

Figure 4:
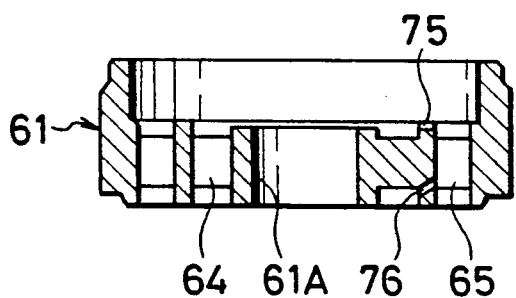
FIG. 4 illustrates a piston body, in which (A) shows a section and (B) shows a plan view.
Figure 4:
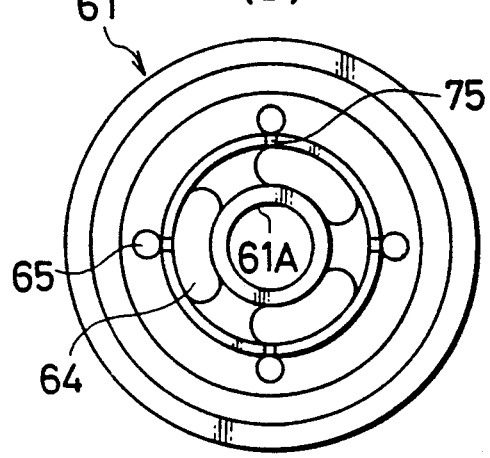

As shown in FIGS. 1 and 2, the shock absorber assembly 24 comprises the piston body 61 bonded on the inner periphery of the sliding tube 22 at its lower end/In addition, a retaining ring 62 is put at the upper part of the bonding portion of the sliding tube and the piston body 61. As shown in FIGS. 4(A) and (B), the piston body 61 demarcates an upper chamber 63A on the side of the sliding tube 22 and a lower chamber 63B on the side of the fork leg 23, and has an elongated hold-shaped compression stroke flow passage 64 and a circular-shaped extension stroke flow passages 65 which enable to communicate the upper chamber 63A and the lower chamber 63B. The compression stroke flow passages 64 are arranged on the central side of the piston body and the extension stroke flow passages 65 on the outer peripheral side thereof, respectively.

It should be noted that the upper chamber 63A is defined by an upper plug member 103 with an O-ring 102 mounted on the outer periphery thereof fixed at the upper end portion of the sliding tube 22 by means of a stop ring 101, and the piston body 61. A working fluid and air is filled in the upper chamber 63A so that the working fluid is positioned at the side of the piston body 61 to form a pneumatic pressure accumulator chamber thereabove. Similarly, the lower chamber 63B is defined between the end plug member 48 and the piston body 61. Working fluid is also filled in the lower chamber 63B.

In the shock absorber assembly 24, a slide valve type first valve 67 biased by a valve spring 66 in such a direction that the compression stroke flow passages 64 are shut, is arranged on the upper chamber side of the piston body 61. When the suspension system 20 is compressed through compression stroke motion, pressure difference is caused between the upper and lower chambers 63A and 63B. When the pressure difference becomes greater than the bias force of the valve spring 68, the first valve 67 is shifted against the spring force to form a variable flow restrictive path to permit the working fluid to flow from the lower chamber 63B to the upper chamber 63A. Magnitude of fluid flow path area of the variable flow restrictive path defined by shifting of the first valve 67 is variable depending upon the magnitude of the pressure difference. Variable magnitude of damping force is generated depending upon magnitude of flow restriction at the variable flow restrictive path.

Here, a mounting bolt 68 is engaged to a threaded center bore 61A of the piston body 61. In a clearance between a bolt head 68A and a nut 69, a collar 71, the piston body 61, and a valve stopper 72 are arranged. A spring seat 73 at the side of the bolt head 68A and the first valve 67 at the side of the piston body 61 are arranged around the collar 71. The valve spring 66 is disposed between the spring seat 73 and the first valve 67. The position of the valve seat 73 is determined by the bolt head 68A of the bolt 68. The position of the valve seat 73 may also be adjusted by means of an adjuster 81 discussed later.

Furthermore, in the shock absorber assembly 24, a disc valve type second valve 74 which opens the extension stroke flow passages 65 due to the negative pressure of the lower chamber 63B when the sliding tube 22 and fork leg 23 are in the extension stroke, is arranged on the lower chamber 63B side of the piston body 61.

When the suspension system 20 is extended with compressing the working fluid in the upper chamber 63A to cause pressure difference between the upper and lower chambers 63A and 63B, and the pressure difference becomes great enough to overcome the resilient force of the second valve 74, the second valve 74 is resiliently deformed to define a variable flow restrictive path between the piston body 61 to permit the working fluid to flow from the upper chamber 63A to the lower chamber 63B through the extension stroke flow passages 65. Damping force against relative extension motion of the sliding tube 22 and the fork leg 23 is thus generated due to flow restriction by the variable flow restrictive fluid path. Similarly to the foregoing first valve 67, the path area of the variable flow restrictive path is variable depending upon magnitude of pressure difference.

It should be noted that the pneumatic chamber in the upper chamber 63A is also effective for absorbing extension energy by permitting compression of the air therein.

Figure 5:
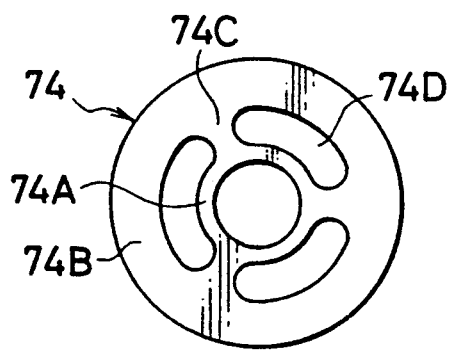
FIG. 5 is a plan view of a disk valve.

The second valve 74 comprises, as shown in FIG. 5, an inside annular portion 74A and an outside annular portion 74B, wherein the inside annular portion 74A and the outside annular portion 74B are connected by way of connecting portions 74C. The inside annular portion 74A is fixed on the lower end face of the piston body 61 by intermediary of the valve pressure member 72 by a nut 69, and the outside annular portion 74B is arranged so as to be capable of shutting the extension stroke flow passage 65. Namely, the outside annular portion 74B can be displaced by the spring action of the connecting portions 74C so that the extension stroke flow passages 65 are shut. In addition, the elongated hole portion 74D corresponding to the compression stroke flow passages 64 are provided on both sides of the connecting portion 74C between the inside annular portion 74A and the outside annular portion 74B.

With the construction set forth above, the second valve 74 can be provided sufficient rigidity for producing sufficiently large damping force against large magnitude of pressure difference during extension stroke motion. On the other hand, the second valve 74 can have sufficiently high response characteristics even for small magnitude of pressure difference by the flexibility provided at the connecting portion 74C.

In the shock absorber assembly 24, the piston body 61 has slits 75 and/or orifices 76 provided therein as throttle communication passages which constantly communicate the upper and lower chambers 63A and 63B. As shown in FIGS. 4(A) and (B), the slits 75 and the orifices 76 serve to communicate an area on the side of the extension side flow passages 65 that is never shut by the first valve 67 and an area on the side of the compression stroke flow passages 64 that is never shut by the second valve 74. Therefore, either in the compression stroke and the extension stroke of the suspension system 20, the shock absorber assembly 24 can generate damping force due to flow restriction through the slits 75 and the orifices 76 which constantly establish fluid communication between the upper and lower chambers 63A and 63B.

In addition, to the upper plug member 103 provided at the upper end portion of the sliding tube 22 as set forth above, an operation member 82 of the adjuster 81 is mounted though an O-ring 83 in rotatable fashion. The upper end portion of the operation member 82 extending from the sliding tube 22 is formed to have two flat faces for facilitating gripping and rotatingly operating the adjuster 81. The lower end portion of the operating member 82 extending within the sliding tube 22 is formed into semi-circular cross section and coupled with the upper end of an adjusting pipe 84. The coupling between the lower end of the operating member 82 and the upper end of the adjusting pipe 84 is established in such a manner than they are restricted in the relative displacement in the circumferential direction but permitted in the relative displacement in the axial direction. An adjusting nut 85 is rigidly secured on the lower end of the adjusting pipe 84. The adjusting nut 85 is coupled with the bolt head 68A of the bolt 68 by thread engagement with the threaded portion on the bolt head. The lower end of the nut 85 can be extended downwardly across the axial position of the lower end face of the bolt head 68A to contact with the spring seat 73. Namely, the adjuster 81 is permitted to rotate the adjusting nut 85 by the operation member 82 through the adjusting pipe 84 to threadingly shift the adjusting nut 85 relative to the bolt head 68A to shift the spring seat 73 up and down. By adjustment of the axial position of the spring seat 73, the spring force of the valve spring 66 to be exerted on the first valve 67 can be adjusted. Therefore, the damping force to be generated during the compression stroke of the suspension system 20 can be adjusted.

It should be noted that an air valve 86 is provided at the center of the operation member 82 of the adjuster 81. The air valve 86 is operable for adjusting the air pressure in the pneumatic chamber of the upper chamber 63A.

The operation of the above-discussed embodiment of the suspension system according to the invention will be discussed herebelow.

(1) The cross member 27 is connected to the upper portions of the fork legs 23 through the cross member holders 26. Accordingly, it becomes unnecessary to provide a cross member mounting boss at the upper portion of the fork leg 23. It thus makes it unnecessary to perform machining process for forming the cross member mounting boss after forming the fork leg through casting process, for example. Consequently, the tubular material, such as the extrusion tube, drawing tube and so forth, can be used as a material for forming the fork leg.

(2) The cross member holder 26 can be mounted on the upper portion of the fork leg 23 in a manner that the relative circumferential displacement can be completely prevented by the screw engagement and/or the key engagement as set forth above. This makes it possible to provide higher torsional strength.

(3) On the other hand, in either case that the brake lever 34 is secured on the cross member holder 26 independently of the cross member or that the brake lever 34 is secured on the cross member holder 26 commonly with the cross member 27, it becomes unnecessary to change the construction and design of the fork leg 23 even when the mounting position of the brake lever 34 is changed due to change of the components of the brake system or so forth.

(4) When the suspension system 20 is in the compression stroke, the first valve 67 opens the compression stroke flow passages 64 against the bias force of the valve spring 66, and the fluid in the lower chamber 63B is transferred into the upper chamber 63A through the variable flow restrictive fluid path defined by the first valve 67. Since the first valve 67 is thus active to restrict fluid flow therethrough, the damping force against the relative motion of the sliding tube 22 and the fork leg 21 can be generated. When the suspension system 20 is in the extension stroke, the second valve 74 which opens the extension stroke flow passage 65 changes the magnitude of deflection in response to the pressure difference between the upper and lower chambers 63A and 63B, and thereby defines the variable flow restrictive fluid path to generate the damping force. In addition, either in the compression stroke and the extension stroke of the suspension system 20, the flow restrictive communication passages (the slits 75 and/or the orifices 76) constantly maintain fluid communication between the upper and lower chambers 63A and 63B, and thereby generating the damping force due to flow resistance therethrough.

It should be noted that the variable flow restrictive paths defined by the first and second valves 67 and 74 generate the damping force which is proportional to generally $\frac{3}{2}$ power of the relative stroke speed of the sliding tube and the fork leg, and the fixed path area orifices and slits generate the damping force which is proportional to generally the square of the relative stroke speed of the sliding tube and the fork leg. Therefore, by combination of the variable flow restrictive fluid path and the fixed path area orifices or slits, substantially liner damping characteristics relative to the relative stroke of the sliding tube and fork leg can be obtained.

Accordingly, it is possible to constitute the stable suspension system 20 in which shock can be satisfactorily absorbed even when the shock is caused due to small undulation of the road surface, and the damping force can be generated both in the compression and extension strokes.

(5) Since the disc valve serving as the second valve 74 is provided with the radially extending connecting portions 74C between the inner annular portion 74A and the outer annular portion 74B, the outer annular portion 74B can be deflected in relatively large magnitude with the spring effect of the connecting portions 74C. Therefore, the second valve 74, with the simple construction, can generate the damping force proportional to the pressure difference between the upper and lower chambers 63A and 63B by varying magnitude of displacement of the outer annular portion 74B to open the extension stroke flow passages 65 during extension stroke of the suspension system 20.

(6) With the adjuster 81, the position of the spring seat 73 seating the valve spring 66 of the first valve 67 can be easily adjusted from the outside of the sliding tube 22. Therefore, the spring force to be exerted on the first valve 67 can be adjusted for adjusting the damping characteristics in the compression stroke.

Figure 8:
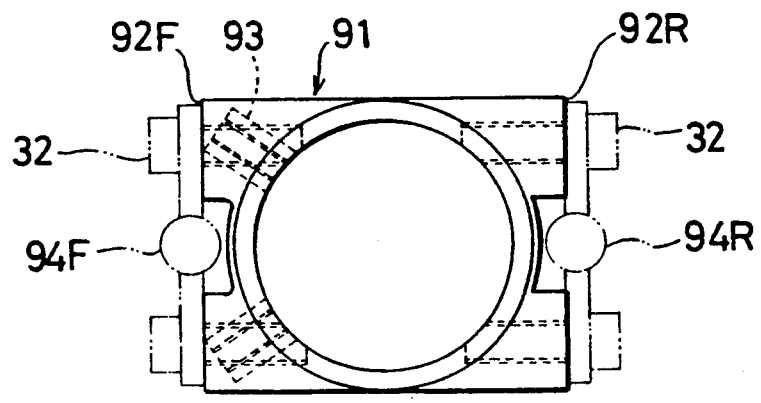
FIG. 8 is a plan view showing another embodiment of the cross member holder.

FIG. 8 is a plan view showing another embodiment of the cross member holder.

The cross member holder 91 has respect of front and rear cross member mounting bosses 92F and 92R and two threaded bosses 93. The cross member holder 91 is fixedly secured on the fork leg 23 by means of fastening screws 32 threadingly engaging with the threading bosses 93 and firmly and tightly abutting onto the outer periphery of the fork leg 23. The front cross member mounting bosses 92F of the cross member holders 91 secured on the left and right fork legs 23, are connected by a front cross member 94F. Similarly, the rear cross member mounting bosses 92R of the cross member holders 91 are connected by a rear cross member 94R.

With this construction, the front and rear cross members 94F and 94R can be provided on both of the front and rear sides of the fork legs 23. Accordingly, the rigidity of the suspension system 20 can be further increased.

Figure 9:
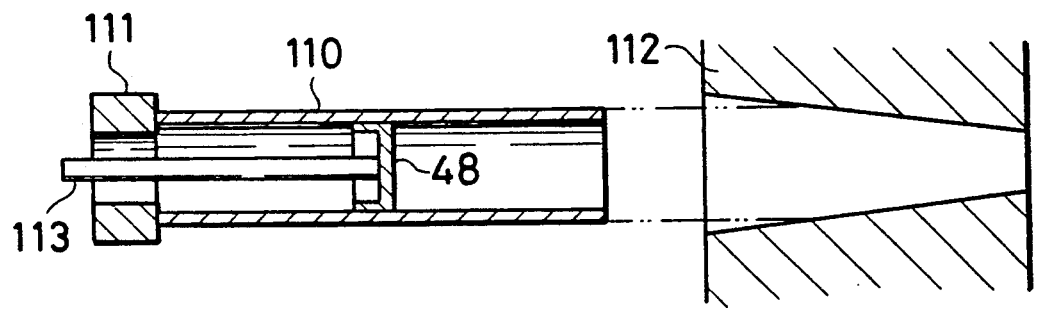
FIG. 9(A) and FIG. 9(B) are diagrammatic illustrations showing a production process of a fork leg.
Figure 9:
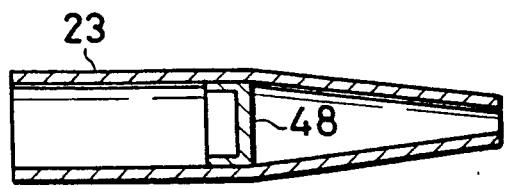

On the other hand, the fork leg 23 which is employed in the preferred embodiment of the suspension system according to the invention is produced through the process including the following steps (1) through (3) (see FIGS. 9(A) and (B)).

(1) As a material for the fork leg 23, a cylindrical tubular material, such as the extrusion tube, drawing tube and so forth, is provided.

(2) The circular end plug member 48 is positioned in a position to define the above-mentioned lower chamber 63B in the fork leg 23.

(3) By depressing the upper end of the form leg 23, reducing forging is performed for the lower portion of the fork leg 23 with a dies 112. During this step, the end plug member 48 is integrally fixed in place within the fork leg 23. In FIG. 9(A), the reference numeral 113 denotes a holding tool for the end plug member.

With the embodiment set forth above, utilizing the fact that the end plug member 48 is secured within the interior space of the form leg 23 for defining the lower chamber 63B, the reducing forging for the lower portion of the fork leg 23 is performed for the tubular material using the end plug member 48 as a core metal.

Accordingly, the fork leg 23 can be processed by reducing forging with maintaining the circularity at the portion of the lower chamber 63B where the sliding tube 22 slides. As a result, with simple process, high precision and less expensive fork leg 23 can be obtained.

As set forth above, according to the present invention, in the construction of the suspension system, in which the sliding tube and the fork leg are coupled in the telescopic fashion and the fork legs at both sides are connected to each other by the cross member for assuring sufficient rigidity, the tubular member can be used as a material for the fork leg.

Also, according to the present invention, the suspension system which can provide shock absorbing effect even for the small undulation or projection and/or detente on the road surface, and can generate damping force both in the compression and extension strokes. Therefore, the suspension system according to the present invention can assure a stable and comfortable ride.

In addition, according to the present invention, a fork leg which can produced through the simple process with high accuracy and low cost, can be provided.

While the present invention has been discussed hereabove in terms of the preferred embodiment of the invention, the present invention can be implemented in various construction and process obvious to those skilled in the art without departing from the principle and spirits of the invention set out in the appended claims. Therefore, it should be appreciated that the present invention includes all possible embodiment, modifications, omissions and processes which can be embodies within the scope of the appended claims.

What is claimed is:

1. A wheel suspension system for a bicycle comprising:
    a pair of left and right sliding tubes secured to a steering bracket which is rotatably supported in a front portion of a body frame of the bicycle;
    a pair of left and right cylindrical fork legs supporting a front wheel and slidably receiving a corresponding one of said sliding tubes;
    a pair of shock absorber assemblies respectively disposed between associated sliding tubes and said fork legs;
    a pair of cross member holders externally mounted on outer peripheries of upper portions of each of said fork legs; and
    a cross member providing a predetermined torsional strength and coupled to said cross member holders wherein an upper end of each fork leg has an increased diameter section, the transition between two diameters defining a shoulder, each cross member holder abuttingly mounted on said shoulder, the space between an outer circumference of each sliding tube and an inner surface of the increased diameter section of each fork leg defining a seal receiving compartment, and a retainer ring for receiving each cross member holder on the respective fork leg.

2. A wheel suspension system as set forth in claim 1, wherein each of said cross member holders is provided front and rear mounting sections, one of said cross members is a front cross member provided for bridging between front mounting sections of said cross member holders on each of said respective left and right fork legs, and the other cross member is a rear cross member provided for bridging between rear mounting sections of said cross member holders.

3. A wheel suspension system as set forth in claim 1, wherein each of said cross member holders is mounted on an outer periphery of said fork member by means of a projection and recess engagement.

4. A wheel suspension system for a bicycle comprising:
    a pair of left and right sliding tubes secured to a steering bracket which is rotatably supported in a front portion of a body frame of the bicycle;
    a pair of left and right fork legs supporting a front wheel and slidably receiving a corresponding one of said sliding tubes;
    a pair of shock absorber assemblies respectively disposed between associated sliding tubes and said fork legs;
    each said shock absorber assembly including
    a piston body defining an upper chamber at a side of said sliding tube and a lower chamber at a side of said fork leg;
    a first valve disposed in a piston at a side of said upper chamber and normally biased for closing a compression stroke flow passage for fluid flow from said lower chamber to said upper chamber;
    a second valve disposed in said piston body at a side of said lower chamber and responsive to a fluid pressure difference between said upper and lower chambers during an extension stroke to open an extension flow passage for fluid flow from said upper chamber to said lower chamber; and a flow restrictive communication passage constantly establishing fluid communication between said upper and lower chambers in a limited fluid flow rate, wherein said second valve comprises a disc valve which comprises an inner annular portion, an outer annular portion and a connecting portion extending between said inner and outer annular portions, said inner annular portion being secured on said piston body, and said outer annular portion is located at a position closing said extension stroke flow passage, and wherein a spring seat is provided for a valve spring of said first valve, which spring seat is adjustable along an axial position for varying a spring force to be exerted on said first valve with an adjusting means externally inserted into said sliding tube in a rotatable fashion, said piston body being mounted on a lower end of the sliding tube, said sliding tube having an upper plug member provided on an upper end portion thereof and including an operation member rotatably supported on said plug member, and an adjusting pipe operably connecting said operable member to said adjusting means.

5. A wheel suspension system as set forth in claim 2, wherein each of said cross member holders is mounted on an outer periphery of said fork member by means of a projection and recess engagement.

* * * * *